(12) United States Patent
Nishizawa et al.

(10) Patent No.: US 12,055,497 B2
(45) Date of Patent: Aug. 6, 2024

(54) METHOD OF MEASURING CONCENTRATION OF NITROGEN IN DIAMOND AND APPARATUS THAT MEASURES CONCENTRATION OF NITROGEN IN DIAMOND

(71) Applicant: SUMITOMO ELECTRIC HARDMETAL CORP., Hyogo (JP)

(72) Inventors: Masayuki Nishizawa, Hyogo (JP); Momoko Iida, Hyogo (JP); Kiichi Meguro, Hyogo (JP)

(73) Assignee: SUMITOMO ELECTRIC HARDMETAL CORP., Hyogo (JP)

( * ) Notice: Subject to any disclaimer, the term of this patent is extended or adjusted under 35 U.S.C. 154(b) by 142 days.

(21) Appl. No.: 17/628,773

(22) PCT Filed: Apr. 28, 2021

(86) PCT No.: PCT/JP2021/016972
§ 371 (c)(1),
(2) Date: Jan. 20, 2022

(87) PCT Pub. No.: WO2022/230107
PCT Pub. Date: Nov. 3, 2022

(65) Prior Publication Data
US 2023/0358685 A1    Nov. 9, 2023

(51) Int. Cl.
*G01N 21/87* (2006.01)
*G01N 21/27* (2006.01)
*G01N 21/55* (2014.01)

(52) U.S. Cl.
CPC ............. *G01N 21/87* (2013.01); *G01N 21/27* (2013.01); *G01N 21/55* (2013.01)

(58) Field of Classification Search
CPC ......... G01N 21/87; G01N 21/27; G01N 21/55
See application file for complete search history.

(56) References Cited

U.S. PATENT DOCUMENTS 4,291,975 A * 9/1981 Raccah .................. G01N 21/87
356/30
4,482,245 A * 11/1984 Makabe .................. G01J 3/46
356/244
(Continued)

FOREIGN PATENT DOCUMENTS

CN    103090973 A *    5/2013
CN    103090973 A      5/2013
(Continued)

OTHER PUBLICATIONS

G. S. Woods et al. "The nitrogen content of type Ib synthetic diamond", Philosophical Magazine B, 1990, vol. 62, No. 6, pp. 589-595.
(Continued)

*Primary Examiner* — Tri T Ton
*Assistant Examiner* — Jarreas Underwood
(74) *Attorney, Agent, or Firm* — Renner, Otto, Boisselle & Sklar, LLP

(57) ABSTRACT

A method of measuring a concentration of nitrogen in diamond includes a first step, a second step, and a third step. In the first step, diamond is arranged in the inside of an integrating sphere. In the second step, visible light is emitted to the inside of the integrating sphere and the visible light that is reflected by an inner surface of the integrating sphere and passes through or is reflected by diamond arranged in the inside of the integrating sphere is received. In the third step, the concentration of nitrogen in diamond is calculated based on data on received visible light and a mass of diamond.

6 Claims, 14 Drawing Sheets

(56) References Cited

U.S. PATENT DOCUMENTS

| | | | | |
|---|---|---|---|---|
| 4,508,449 A | * | 4/1985 | Okazaki | G01N 21/87 356/244 |
| 5,536,943 A | * | 7/1996 | Smith | G01N 21/87 356/30 |
| 11,467,101 B2 | * | 10/2022 | Cheng | G01N 21/958 |
| 2006/0098187 A1 | * | 5/2006 | Claus | G01N 21/87 356/30 |
| 2019/0213757 A1 | * | 7/2019 | Cheng | G06T 7/90 |

FOREIGN PATENT DOCUMENTS

| | | | | |
|---|---|---|---|---|
| EP | 41348 A2 | | 12/1981 | |
| GB | 2199657 A | * | 7/1988 | B07C 5/3427 |
| JP | S57-48642 A | | 3/1982 | |
| JP | S58-728 A | | 1/1983 | |
| JP | 858-92920 A | | 6/1983 | |
| JP | 5-507791 A | | 11/1993 | |
| RU | 2537857 C2 | * | 1/2015 | C30B 25/02 |
| WO | 91/16617 A1 | | 10/1991 | |
| WO | WO-2019180718 A1 | * | 9/2019 | G01N 22/02 |

OTHER PUBLICATIONS

Zaitsev, A.M. et al., Nitrogen-doped CVD diamond; Nitrogen concentration, color and internal stress, Diamond & Related Materials, Mar. 3, 2020, vol. 105, pp. 107794 1-13, https://doi.org/10.1016/j.diamond.2020.107794 Sections 2, 3.2, 3.4, Fig. 2, Fig. 4.

Tian, Y. et al., "Dependence of nitrogen concentration in type Ib diamonds on synthesis temperature", Chinese Science Bulletin, May 2009, vol. 54, No. 9, pp. 1459-1462.

* cited by examiner

METHOD OF MEASURING CONCENTRATION OF NITROGEN IN DIAMOND AND APPARATUS THAT MEASURES CONCENTRATION OF NITROGEN IN DIAMOND

TECHNICAL FIELD

The present disclosure relates to a method of measuring a concentration of nitrogen in diamond and an apparatus that measures a concentration of nitrogen in diamond.

BACKGROUND ART

PTL 1 (Japanese Patent Laying-Open No. 57-48642) describes a method of evaluating a color of a precious stone such as diamond. PTL 2 (Japanese Patent Laying-Open No. 58-728) and PTL 3 (Japanese Patent Laying-Open No. 58-92920) describe a diamond color measurement apparatus capable of measuring a color of brilliant cut diamond.

CITATION LIST

Patent Literature

PTL 1: Japanese Patent Laying-Open No. 57-48642
PTL 2: Japanese Patent Laying-Open No. 58-728
PTL 3: Japanese Patent Laying-Open No. 58-92920

SUMMARY OF INVENTION

A method of measuring a concentration of nitrogen in diamond according to the present disclosure includes a first step, a second step, and a third step. In the first step, diamond is arranged in the inside of an integrating sphere. In the second step, visible light is emitted to the inside of the integrating sphere and the visible light that is reflected by an inner surface of the integrating sphere and passes through or is reflected by the diamond arranged in the inside of the integrating sphere is received. In the third step, a concentration of nitrogen in the diamond is calculated based on data on the received visible light and a mass of the diamond.

An apparatus that measures a concentration of nitrogen in diamond according to the present disclosure includes an integrating sphere, a light emitter, a light receiver, and a calculator. The light emitter emits visible light to the inside of the integrating sphere. The light receiver receives the visible light that is reflected by an inner surface of the integrating sphere and passes through or is reflected by the diamond. The calculator calculates a concentration of nitrogen in the diamond based on data on the visible light received by the light receiver and a mass of the diamond.

DETAILED DESCRIPTION

Figure 1:
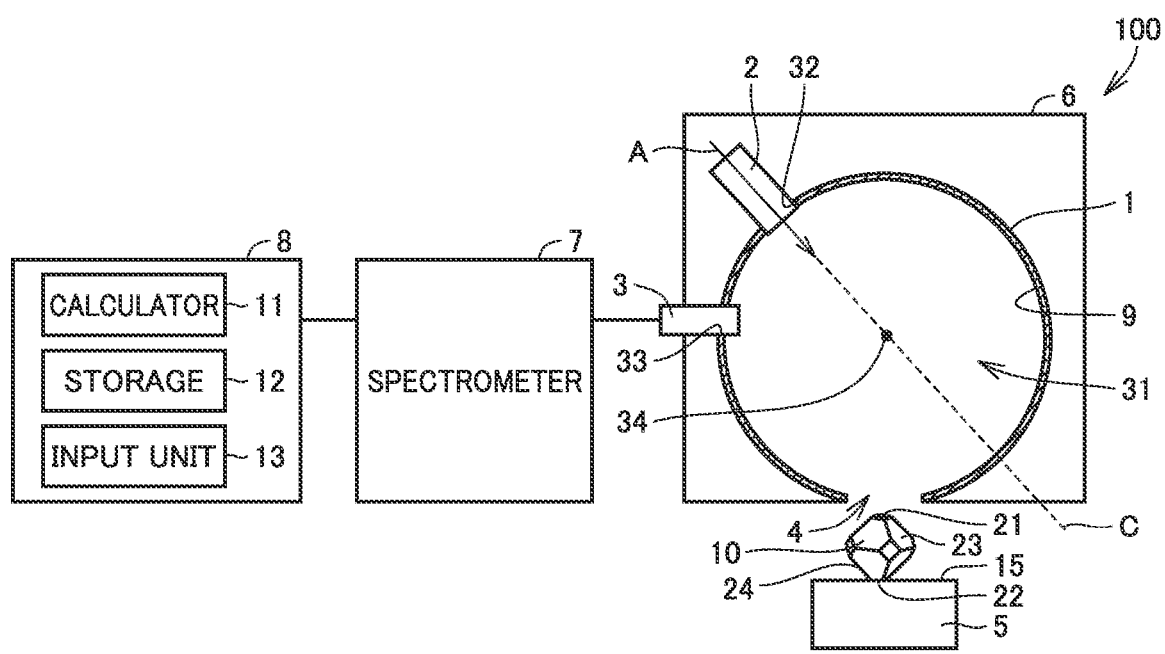
FIG. 1 is a partial schematic cross-sectional view showing a construction of an apparatus that measures a concentration of nitrogen in diamond according to the present embodiment.

[Problem to be Solved by the Present Disclosure]

A visual comparison method using a color tone chart is available as a method of measuring a concentration of nitrogen in diamond. The color tone chart is prepared by making use of such characteristics that a color tone of diamond is varied depending on a concentration of nitrogen. Initially, a plurality of pieces of diamond different in color tone are prepared and the pieces of diamond are machined into a shape like a flat plate. Then, the concentration of nitrogen in diamond is measured with a Fourier transform-infrared spectrometer (FT-IR) method. The color tone chart in which the concentration of nitrogen in diamond and the color tone are brought in correspondence with each other is prepared. An inspector estimates the concentration of nitrogen in diamond which is a measurement target by observing the color tone of diamond and thereafter comparing the color tone of diamond with the color tone chart.

Diamond, however, is high in index of refraction. Therefore, the color tone of diamond varies depending on how light impinges on diamond. The concentration of nitrogen in diamond estimated with the visual comparison method is affected also by experiences and physical conditions of the inspector. Therefore, results of measurement of the concentration of nitrogen in diamond vary. Consequently, the visual comparison method using the color tone chart has not been accurate in measurement of the concentration of nitrogen in diamond.

A method of directly measuring a concentration of nitrogen in diamond with the FT-IR method is also available as another method of measuring a concentration of nitrogen in diamond. The measurement method based on FT-IR overcomes the problem of variation in results of measurement of the concentration of nitrogen among inspectors. Measurement per se with the FT-IR method is non-destructive. In order to accurately measure the concentration of nitrogen in diamond, however, pieces of diamond various in shape and size should be machined into a shape standardized for measurement (a shape like a flat plate having a thickness set in advance). Therefore, when the standardized shape is not suited to a final shape for use of an object to be measured, this measurement method cannot be adopted. Therefore, in the FT-IR method, diamond should be machined to change the shape thereof into the standardized shape. In other words, the FT-IR method is substantially destructive testing.

The present disclosure was made in view of problems as above, and an object thereof is to provide a method of measuring a concentration of nitrogen in diamond and an apparatus that measures a concentration of nitrogen in diamond that are capable of accurately measuring a concentration of nitrogen in diamond regardless of a shape and a size of diamond, without changing a shape of diamond.

Advantageous Effect of the Present Disclosure

According to the present disclosure, a method of measuring a concentration of nitrogen in diamond and an apparatus that measures a concentration of nitrogen in diamond that are capable of accurately measuring a concentration of nitrogen in diamond regardless of a shape and a size of diamond, without changing a shape of diamond, can be provided.

DESCRIPTION OF EMBODIMENT OF THE PRESENT DISCLOSURE

Embodiments of the present disclosure will initially be listed and described.

(1) A method of measuring a concentration of nitrogen in diamond 10 according to the present disclosure includes a first step, a second step, and a third step. In the first step, diamond is arranged in inside 31 of an integrating sphere 1. In the second step, visible light is emitted to inside 31 of integrating sphere 1, and the visible light that is reflected by an inner surface 9 of integrating sphere 1 and passes through or is reflected by diamond 10 arranged in inside 31 of integrating sphere 1 is received. In the third step, a concentration of nitrogen in diamond 10 is calculated based on data on the received visible light and a mass of diamond 10.

According to the method of measuring a concentration of nitrogen in diamond 10 according to (1), diamond 10 is arranged in inside 31 of integrating sphere 1. A light emitter 2 emits visible light to inside 31. Visible light emitted to inside 31 is reflected by inner surface 9 of integrating sphere 1 with which diamond 10 is irradiated from various directions, passes through or is reflected by diamond 10, and is finally received by a light receiver 3. A calculator 11 calculates the concentration of nitrogen in diamond 10 based on data on visible light received by light receiver 3 and a mass of diamond 10. By using integrating sphere 1, diamond 10 is irradiated with visible light from substantially all directions. Therefore, visible light averaged over whole diamond 10 (visible light that is incident on diamond from every direction owing to the integrating sphere and passes through or is reflected by diamond) is received. Therefore, the concentration of nitrogen in diamond 10 can be measured more accurately than in measurement of the concentration of nitrogen in diamond 10 with the visual comparison method.

According to the method of measuring a concentration of nitrogen in diamond 10 according to (1), diamond 10 which is a measurement target does not have to be machined into a shape like a flat plate as in measurement of the concentration of nitrogen in diamond 10 with the FT-IR method. Therefore, the concentration of nitrogen in diamond 10 can be measured without changing the shape of diamond 10.

According to the method of measuring a concentration of nitrogen in diamond 10 according to (1), by taking into account the mass of diamond 10, the concentration of nitrogen in diamond 10 can be measured regardless of the shape and the size of diamond 10.

(2) According to the method of measuring a concentration of nitrogen in diamond 10 according to (1), with a reflectance of the visible light in a first wavelength range being defined as a first reflectance, with a reflectance of the visible light in a second wavelength range being defined as a second reflectance, and with a value calculated by dividing the second reflectance by the first reflectance being defined as a reflectance ratio, the data on the visible light may include the reflectance ratio. The first wavelength range may have a lower limit value smaller than 540 nm and smaller than a lower limit value of the second wavelength range. The second wavelength range may have an upper limit value larger than 580 nm. The first wavelength range may be smaller in upper limit value than the second wavelength range. In the third step, a carat of the diamond may be calculated based on the mass of the diamond, a coefficient A1 and a coefficient A2 in an expression 1 may be determined based on the calculated carat of the diamond, and the concentration of nitrogen in the diamond may be calculated based on the expression 1.

[Expression 1]

$$\text{nitrogen concentration}(ppm) = A1 \times e^{(A2 \times \text{reflectance ratio})} \quad \text{(Expression 1)}$$

According to the method of measuring a concentration of nitrogen in diamond 10 according to (2) and (1), the concentration of nitrogen in diamond is calculated by comparing the reflectance in the first wavelength range with the reflectance in the second wavelength range, the first wavelength range having the lower limit value smaller than 540 nm which is the lower limit value of a wavelength range (a third wavelength range) in which transition from increase in reflectance with increase in concentration of nitrogen in diamond to lowering in reflectance with increase in concentration of nitrogen in diamond is made, the second wavelength range having the upper limit value larger than 580 nm which is the upper limit value of the third wavelength range. Therefore, the concentration of nitrogen in diamond can be measured more accurately than in calculation of the concentration of nitrogen in diamond simply based on the reflectance in the first wavelength range alone, the reflectance in the second wavelength range alone, or the reflectance in the third wavelength range alone.

(3) According to the method of measuring a concentration of nitrogen in diamond 10 according to (2), the first wavelength range does not have to overlap with the second wavelength range. The concentration of nitrogen in diamond can thus further accurately be measured.

(4) According to the method of measuring a concentration of nitrogen in diamond 10 according to (3), the first wavelength range may have the upper limit value smaller than 540 nm. The second wavelength range may have the lower limit value larger than 580 nm. The concentration of nitrogen in diamond can thus further accurately be measured.

(5) According to the method of measuring a concentration of nitrogen in diamond 10 according to any one of (1) to (4), in the second step, the visible light emitted to the inside of the integrating sphere may be reflected by the inner surface of the integrating sphere at least once and thereafter may pass through or may be reflected by the diamond arranged in the inside of the integrating sphere.

(6) An apparatus that measures a concentration of nitrogen in diamond 10 according to the present disclosure includes integrating sphere 1, light emitter 2, light receiver 3, and calculator 11. Light emitter 2 emits visible light to inside 31 of integrating sphere 1. Light receiver 3 receives the visible light that is reflected by inner surface 9 of integrating sphere 1 and passes through or is reflected by diamond 10. Calculator 11 calculates a concentration of nitrogen in diamond 10 based on data on the visible light received by light receiver 3 and a mass of diamond 10.

The apparatus that measures a concentration of nitrogen in diamond 10 according to (6) includes integrating sphere 1, light emitter 2, light receiver 3, and calculator 11. Calculator 11 calculates the concentration of nitrogen in diamond 10 based on data on "averaged visible light (visible light that is incident on diamond from every direction owing to integrating sphere 1 and passes through or is reflected by diamond 10)" received by light receiver 3 and a mass of diamond 10. Therefore, the concentration of nitrogen in diamond 10 can be measured more accurately than in measurement of the concentration of nitrogen in diamond 10 with the visual comparison method.

For the apparatus that measures a concentration of nitrogen in diamond 10 according to (6), diamond 10 which is a measurement target does not have to be machined into a shape like a flat plate as in measurement of the concentration of nitrogen in diamond 10 with the FT-IR method. Therefore, the concentration of nitrogen in diamond 10 can be measured without changing the shape of diamond 10.

According to the method of measuring a concentration of nitrogen in diamond 10 according to (1), by taking into account the mass of diamond 10, the concentration of nitrogen in diamond 10 can be measured regardless of the shape and the size of diamond 10.

(7) According to the apparatus that measures a concentration of nitrogen in diamond according to (6), a sample insertion hole 4 may be provided in integrating sphere 1. Light emitter 2 may be arranged such that a straight line along a direction of incidence A of the visible light does not pass through sample insertion hole 4 but intersects with inner surface 9. Thus, direct incidence on diamond, of visible light emitted to the inside of the integrating sphere before scattering at the inner surface of the integrating sphere (incidence of most of incident light on diamond from a specific direction) can be avoided, and it can reliably be ensured that visible light received by the light receiver is "averaged visible light (visible light that is incident on diamond from every direction owing to integrating sphere 1 and passes through or is reflected by diamond 10)". Therefore, regardless of arrangement of diamond 10, the concentration of nitrogen in diamond 10 can more accurately be measured.

Details of Embodiment of the Present Disclosure

Details of an embodiment of the present disclosure will be described below with reference to the drawings. The same or corresponding elements in the drawings below have the same reference characters allotted and redundant description will not be repeated. Regarding crystallographic denotation herein, an individual orientation, a group orientation, an individual plane, and a group plane are shown in [ ], < >, ( ) and { }, respectively. A crystallographically negative index is normally expressed by a number with a bar "—" thereabove, however, it is herein expressed by a negative sign preceding a number.

A construction of an apparatus that measures a concentration of nitrogen in diamond 10 according to the present embodiment will initially be described.

FIG. 1 is a partial schematic cross-sectional view showing a construction of an apparatus that measures a concentration of nitrogen in diamond 10 according to the present embodiment. As shown in FIG. 1, an apparatus 100 that measures a concentration of nitrogen in diamond 10 mainly includes integrating sphere 1, light emitter 2, light receiver 3, a spectrometer 7, an analysis personal computer (PC) 8, a housing 6, and a sample carrier 5. Integrating sphere 1 is arranged within housing 6. Integrating sphere 1 includes inner surface 9. Inner surface 9 of integrating sphere 1 is spherical. Integrating sphere 1 has a diameter, for example, not smaller than 40 mm and not larger than 80 mm, although it is not particularly limited. Inner surface 9 of integrating sphere 1 is composed of a material high in reflectance and excellent in diffusivity. For example, Spectralon® is employed as the material. For example, barium sulfate or magnesium oxide (MgO) may be employed as the material.

Integrating sphere 1 is provided with a light inlet 32, a light outlet 33, and sample insertion hole 4. Light emitter 2 is attached to light inlet 32. Light emitter 2 emits visible light to inside 31 of integrating sphere 1. Light emitter 2 can give off visible light. Light emitter 2 is a light source. Light emitter 2 is, for example, a halogen lamp. Light receiver 3 is attached to light outlet 33. Light receiver 3 is an optical sensor. Light receiver 3 can detect visible light. Light receiver 3 receives visible light reflected by inner surface 9 of integrating sphere 1. Light receiver 3 is, for example, a photodiode. Sample insertion hole 4 is provided, for example, vertically below integrating sphere 1. Sample insertion hole 4 has a diameter, for example, not smaller than 1 mm and not larger than 10 mm, although it is not particularly limited.

Sample carrier 5 supports diamond 10 which is a measurement target. Sample carrier 5 is, for example, columnar. Sample carrier 5 includes a carrying surface 15. Carrying surface 15 is planar. Carrying surface 15 may be coated with a material high in reflectance and excellent in diffusivity. Carrying surface 15 has a diameter, for example, not smaller than 20 mm and not larger than 30 mm, although it is not particularly limited. Diamond 10 which is a measurement target is arranged on carrying surface 15. Sample carrier 5 can be moved between (1) a position (measurement position) where diamond 10 placed on (or fixed to) carrying surface 15 is arranged in inside 31 of integrating sphere 1 and sample insertion hole 4 is closed by carrying surface 15 (a state that light does not enter inside 31 of integrating sphere 1 from the outside) and (2) a position (diamond replacement position) where carrying surface 15 is distant from sample insertion hole 4 and diamond 10 can be placed on (or fixed to) carrying surface 15 and diamond 10 placed on (or fixed to) carrying surface 15 can be removed from carrying surface 15.

Spectrometer 7 is connected to light receiver 3. Spectrometer 7 can separate light detected by light receiver 3 for each wavelength. Spectrometer 7 finds relation between intensity and a wavelength of light detected by light receiver 3. Analysis PC 8 mainly includes calculator 11, a storage 12, and an input unit 13. Calculator 11 is typically a computing processing unit such as a central processing unit (CPU) or a micro processing unit (MPU). Calculator 11 calculates a concentration of nitrogen in diamond 10 based on data sent from spectrometer 7. Specifically, calculator 11 calculates the concentration of nitrogen in diamond 10 based on data on visible light received by light receiver 3 and a mass of diamond 10.

Storage 12 is a non-volatile memory such as a random access memory (RAM), a read only memory (ROM), or a flash memory. Data to be used for computation by calculator 11 is stored in storage 12. Specifically, an expression for calculating a nitrogen concentration is stored in storage 12. A mass or a volume of diamond 10 which is a measurement target is stored in storage 12. For example, a keyboard is adopted as input unit 13. Input data provided through input unit 13 is stored in storage 12. A coefficient in an expression for calculating a nitrogen concentration is provided to analysis PC 8 by using input unit 13.

As shown in FIG. 1, light emitter 2 may be arranged such that diamond which is a measurement target is not directly irradiated with visible light. Specifically, light emitter 2 may be arranged such that a straight line C along direction of incidence A of visible light does not pass through sample insertion hole 4. Light emitter 2 is arranged such that straight line C along direction of incidence A of visible light intersects with inner surface 9 of integrating sphere 1. From another point of view, the straight line that passes through sample insertion hole 4 and a center of integrating sphere 1 is inclined with respect to straight line C along direction of incidence A of visible light. Straight line C along direction of incidence A of visible light may or may not pass through a center 34 of integrating sphere 1. In order to have visible light being incident on diamond 10 from every direction to stabilize a result of measurement (to avoid such a situation that incident light enters diamond 10 unevenly from a specific direction), light emitter 2 is desirably arranged such that diamond 10 which is a measurement target is not directly irradiated with visible light but visible light is incident on diamond 10 after being reflected by inside 31 of integrating sphere at least once.

When viewed from the center of integrating sphere 1, a position where sample insertion hole 4 is provided is assumed as 0°, a position where spectrometer 7 is provided is assumed as 90°, a vertically upward position is assumed as 180°, and a position opposed to the position where spectrometer 7 is provided is assumed as 270°. Then, light emitter 2 is provided at a position, for example, larger than 90° and smaller than 180°. Light emitter 2 may be provided at a position, for example, larger than 180° and smaller than 270°. The straight line that passes through the center of integrating sphere 1 and sample insertion hole 4 is inclined with respect to the straight line that passes through center 34 of integrating sphere 1 and light inlet 32. Light receiver 3 is provided at a position, for example, rotated by 90° from sample insertion hole 4 when viewed from the center of integrating sphere 1, A method of measuring a concentration of nitrogen in diamond 10 according to the present embodiment will now be described.

Figure 2:
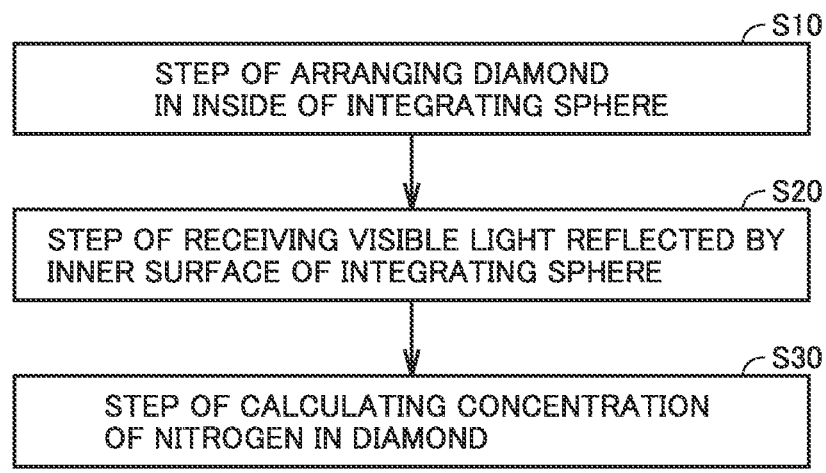
FIG. 2 is a flowchart schematically showing a method of measuring a concentration of nitrogen in diamond according to the present embodiment.

FIG. 2 is a flowchart schematically showing a method of measuring a concentration of nitrogen in diamond 10 according to the present embodiment. As shown in FIG. 2, the method of measuring a concentration of nitrogen in diamond 10 according to the present embodiment mainly includes a step (S10) of arranging diamond in the inside of the integrating sphere, a step (S20) of receiving visible light reflected by the inner surface of the integrating sphere, and a step (S30) of calculating the concentration of nitrogen in diamond.

Initially, the step (S10) of arranging diamond in the inside of the integrating sphere is performed. Specifically, diamond 10 which is a measurement target is placed on carrying surface 15 of sample carrier 5. Diamond 10 may be single-crystal diamond 10 or polycrystalline diamond 10. Diamond 10 is, for example, artificially synthesized single-crystal diamond 10. Single-crystal diamond 10 is synthesized by applying a pressure to a capsule containing, for example, source material carbon and a solvent metal under a high temperature by using an ultra high-pressure and high-temperature press machine. The pressure for synthesis is, for example, not lower than 5 GPa. A temperature for synthesis is, for example, not lower than 1300° C.

Artificially synthesized single-crystal diamond 10 has a facet. From another point of view, the facet is exposed in artificially synthesized single-crystal diamond 10. The facet may be in any polygonal shape and the shape thereof is not particularly limited. The facet is, for example, in a triangular, quadrangular, hexagonal, or octagonal shape or in another polygonal shape. The facet may be in the quadrangular shape. The number of facets should only be set to at least one and the number is not particularly limited. The number of facets may be set to at least two, at least six, or at least twelve. The facet is perpendicular to a specific crystal orientation. The facet is, for example, a {100} face, a {110} face, or a {111} face. Natural diamond normally does not have a facet.

As shown in FIG. 1, single-crystal diamond 10 includes, for example, a first facet 21, a second facet 22, a third facet 23, and a fourth facet 24. Second facet 22 is located opposite to first facet 21. Fourth facet 24 is located opposite to third facet 23. First facet 21 is inclined with respect to third facet 23. Second facet 22 is inclined with respect to fourth facet 24. Diamond 10 is arranged on sample carrier 5, for example, such that second facet 22 is in contact with carrying surface 15. Second facet 22 is substantially in parallel to carrying surface 15 of sample carrier 5.

Figure 3:
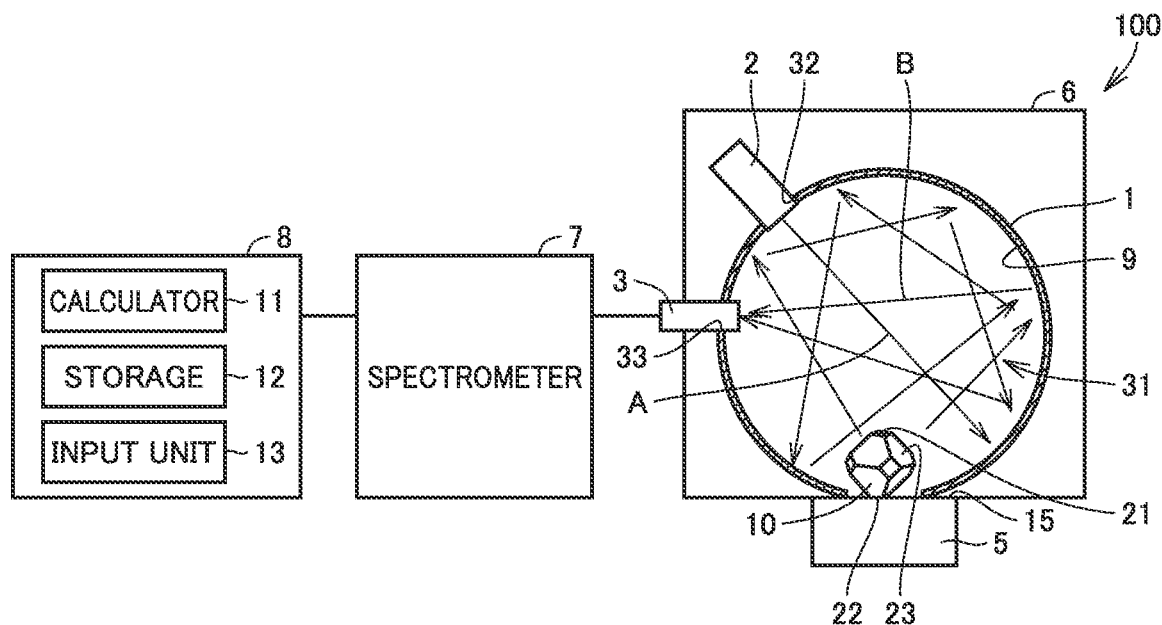
FIG. 3 is a partial schematic cross-sectional view showing a step of arranging diamond in the inside of an integrating sphere.

FIG. 3 is a partial schematic cross-sectional view showing a step of arranging diamond 10 in inside 31 of integrating sphere 1. As shown in FIG. 3, diamond 10 is arranged in inside 31 of integrating sphere 1. Diamond 10 is inserted in inside 31 of integrating sphere 1 through sample insertion hole 4. Sample insertion hole 4 is closed by carrying surface 15 of sample carrier 5. Carrying surface 15 is arranged at a position along inner surface 9 of integrating sphere 1.

Then, the step (S20) of receiving visible light reflected by the inner surface of the integrating sphere is performed. Specifically, inside 31 of integrating sphere 1 is irradiated with visible light from light emitter 2. Direction of incidence A of visible light is adjusted such that visible light is not directly incident on diamond 10 which is a measurement target. Visible light from light emitter 2 is emitted to inner surface 9 of integrating sphere 1 and repeatedly reflected by inner surface 9 and is incident on diamond 10 from various directions. Visible light passes through or is reflected by the inside of diamond 10, is repeatedly reflected by inner surface 9, and is finally received by light receiver 3 as reflected light B. A wavelength range of visible light is not shorter than 380 nm and not longer than 780 nm.

Figure 4:
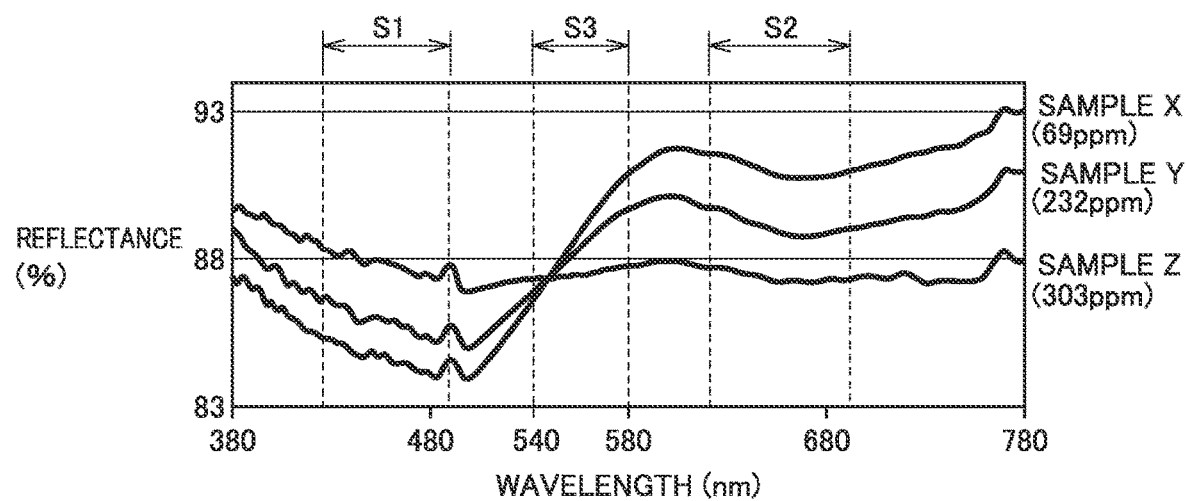
FIG. 4 is a schematic diagram showing relation between a reflectance and a wavelength.

FIG. 4 is a schematic diagram showing relation between a reflectance and a wavelength. In FIG. 4, the abscissa represents a wavelength of visible light received by light receiver 3. In FIG. 4, the ordinate represents a reflectance of visible light. The reflectance of visible light is expressed as a value calculated by dividing intensity of visible light received with diamond 10 being arranged in inside 31 of integrating sphere 1 by intensity of visible light received without diamond 10 being arranged in inside 31 of integrating sphere 1. The concentration of nitrogen in a diamond sample X is 69 ppm. The concentration of nitrogen in a diamond sample Y is 232 ppm. The concentration of nitrogen in a diamond sample Z is 303 ppm. "Without diamond 10 being arranged in inside 31 of integrating sphere 1" refers to a state that sample insertion hole 4 is closed by carrying surface 15 without diamond 10 being placed on (or fixed to) carrying surface 15.

As shown in FIG. 4, in a third wavelength range S3, even when the concentration of nitrogen in the diamond sample is varied, the reflectance of the diamond sample hardly varies. From another point of view, in third wavelength range S3, the reflectance of the diamond sample has a substantially equal value regardless of the concentration of nitrogen in the diamond sample. Third wavelength range S3 is, for example, not shorter than 540 nm and not longer than 580 nm. A lower limit value of third wavelength range S3 is set, for example, to 540 nm. An upper limit value of third wavelength range S3 is set, for example, to 580 nm. A first wavelength range S1 includes a wavelength shorter than third wavelength range S3. Specifically, a lower limit value of first wavelength range S1 is smaller than the lower limit value (540 nm) of third wavelength range S3. A second wavelength range S2 includes a wavelength longer than third wavelength range S3. Specifically, an upper limit value of second wavelength range S2 is larger than the upper limit value (580 nm) of third wavelength range S3.

The lower limit value of first wavelength range S1 is smaller than the lower limit value of second wavelength range S2. The upper limit value of first wavelength range S1 is smaller than the upper limit value of second wavelength range S2. The upper limit value of first wavelength range S1 may be smaller than the lower limit value of third wavelength range S3, may be within third wavelength range S3, or may be larger than the upper limit value of third wavelength range S3. The lower limit value of second wavelength range S2 may be smaller than the lower limit value of third wavelength range S3, may be within third wavelength range S3, or may be larger than the upper limit value of third wavelength range S3.

From a point of view of improvement in measurement accuracy, the upper limit value and the lower limit value of first wavelength range S1 and the upper limit value and the lower limit value of second wavelength range S2 are desirably set such that an overlap between first wavelength range S1 and second wavelength range S2 is smaller. The upper limit value and the lower limit value of first wavelength range S1 and the upper limit value and the lower limit value of second wavelength range S2 are further desirably set such that first wavelength range S1 and second wavelength range S2 do not overlap with each other. Most desirably, the upper limit value of first wavelength range S1 is set to be smaller than the lower limit value of third wavelength range S3 and the lower limit value of second wavelength range S2 is set to be larger than the upper limit value of third wavelength range S3. From another point of view, most desirably, first wavelength range S1 is set on a shorter wavelength side than third wavelength range S3 and second wavelength range S2 is set on a longer wavelength side than third wavelength range S3.

In first wavelength range S1, as the concentration of nitrogen in diamond 10 is lower, the reflectance is lower. First wavelength range S1 is, for example, not shorter than 380 nm and not longer than 530 nm. The lower limit of first wavelength range S1 may be, for example, not shorter than 400 nm or not shorter than 420 nm, although it is not particularly limited. The upper limit of first wavelength range S1 may be, for example, not longer than 510 nm or not longer than 490 nm, although it is not particularly limited. First wavelength range S1 may be not shorter than 380 nm and not longer than 510 nm or not shorter than 380 nm and not longer than 490 nm. First wavelength range S1 may be not shorter than 400 nm and not longer than 530 nm, not shorter than 400 nm and not longer than 510 nm, or not shorter than 400 nm and not longer than 490 nm. First wavelength range S1 may be not shorter than 420 nm and not longer than 530 nm, not shorter than 420 nm and not longer than 510 nm, or not shorter than 420 nm and not longer than 490 nm.

In second wavelength range S2, as the concentration of nitrogen in diamond 10 is lower, the reflectance is higher. Second wavelength range S2 is, for example, not shorter than 580 nm and not longer than 780 nm. The lower limit of second wavelength range S2 may be, for example, not shorter than 600 nm or not shorter than 620 nm, although it is not particularly limited. The upper limit of second wavelength range S2 may be, for example, not longer than 760 nm or not longer than 740 nm, although it is not particularly limited. Second wavelength range S2 may be not shorter than 580 nm and not longer than 760 nm or not shorter than 580 nm and not longer than 740 nm. Second wavelength range S2 may be not shorter than 600 nm and not longer than 780 nm, not shorter than 600 nm and not longer than 760 nm, or not shorter than 600 nm and not longer than 740 nm. Second wavelength range S2 may be not shorter than 620 nm and not longer than 780 nm, not shorter than 620 nm and not longer than 760 nm, or not shorter than 620 nm and not longer than 740 nm.

Then, the step (S30) of calculating the concentration of nitrogen in diamond is performed. Data on received visible light includes, for example, a reflectance ratio. When the reflectance of visible light in first wavelength range S1 is defined as a first reflectance and the reflectance of visible light in second wavelength range S2 is defined as a second reflectance, the reflectance ratio refers to a value calculated by dividing the second reflectance by the first reflectance. The reflectance ratio refers to a value, for example, calculated by dividing an integral of the reflectances of visible light in second wavelength range S2 by an integral of the reflectances of visible light in first wavelength range S1. A pitch between wavelengths used for calculation of the integral is set, for example, to 1 nm. For example, a value calculated by dividing an average value of the reflectances of visible light in second wavelength range S2 by an average value of the reflectances of visible light in first wavelength range S1 may be adopted as the reflectance ratio.

Figure 5:
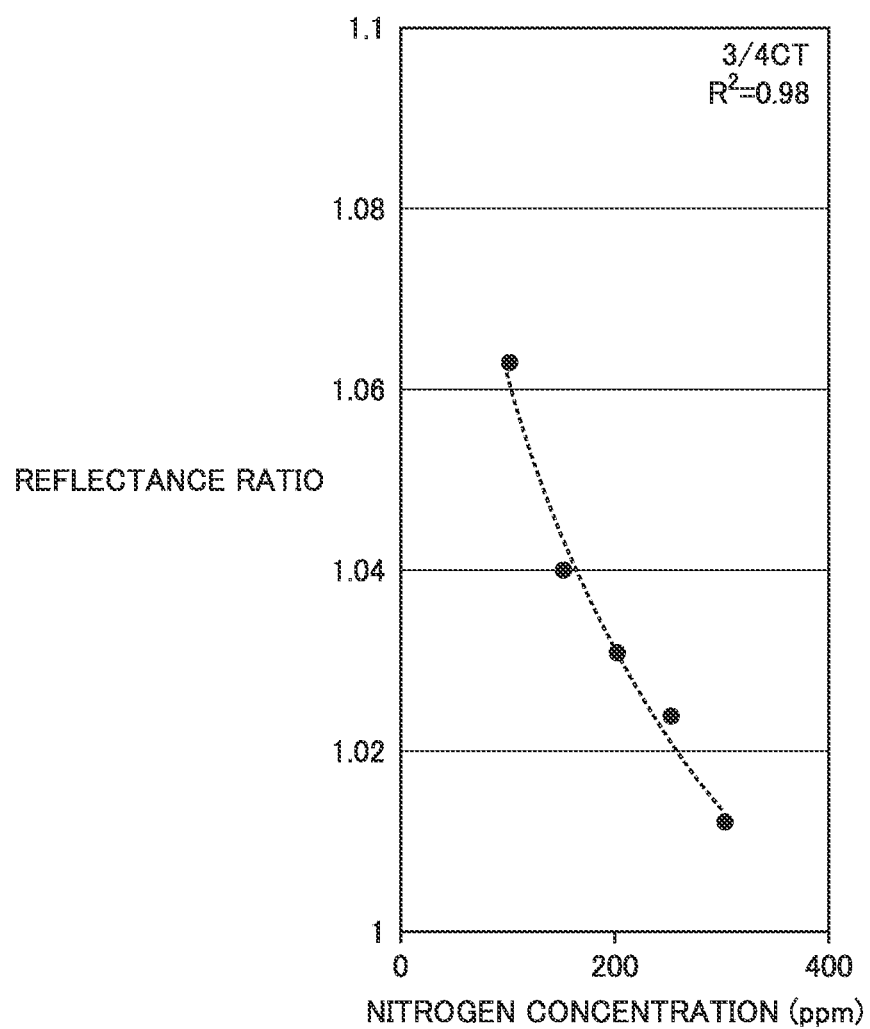
FIG. 5 is a diagram showing relation between a reflectance ratio of diamond and a concentration of nitrogen in diamond in an example in which diamond has a mass of ¾ carat.
Figure 6:
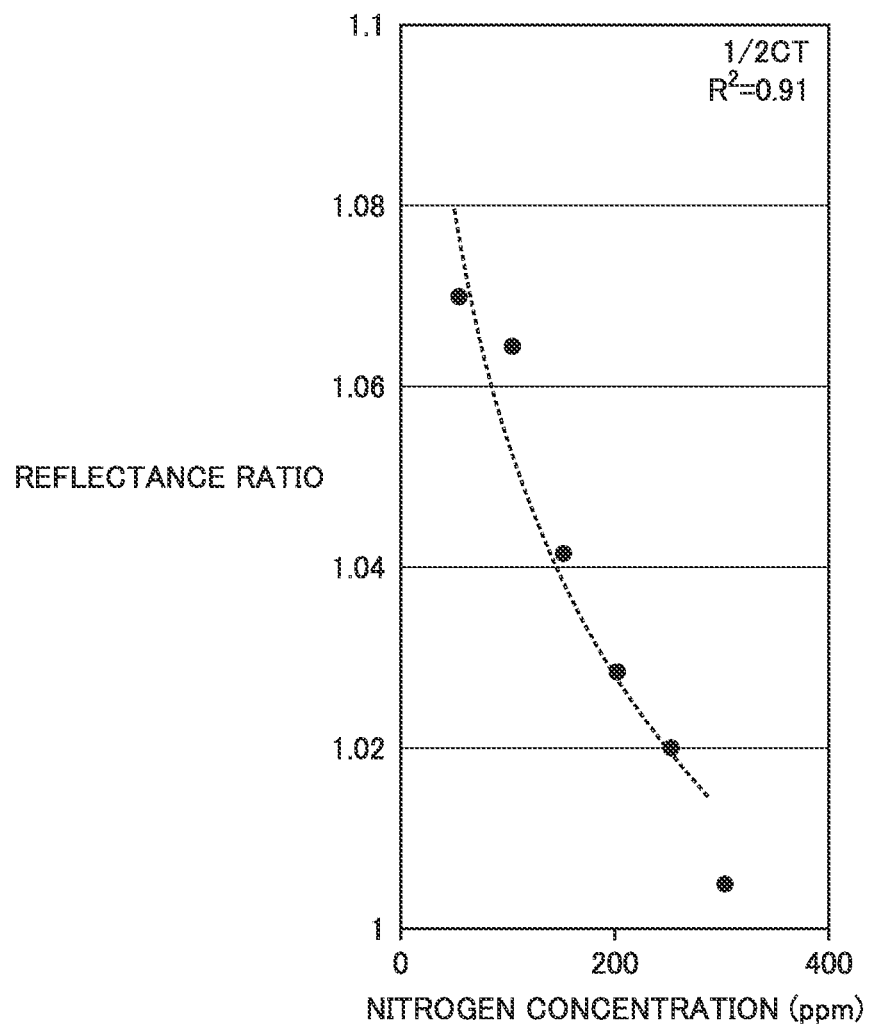
FIG. 6 is a diagram showing relation between a reflectance ratio of diamond and a concentration of nitrogen in diamond in an example in which diamond has a mass of ½ carat.
Figure 7:
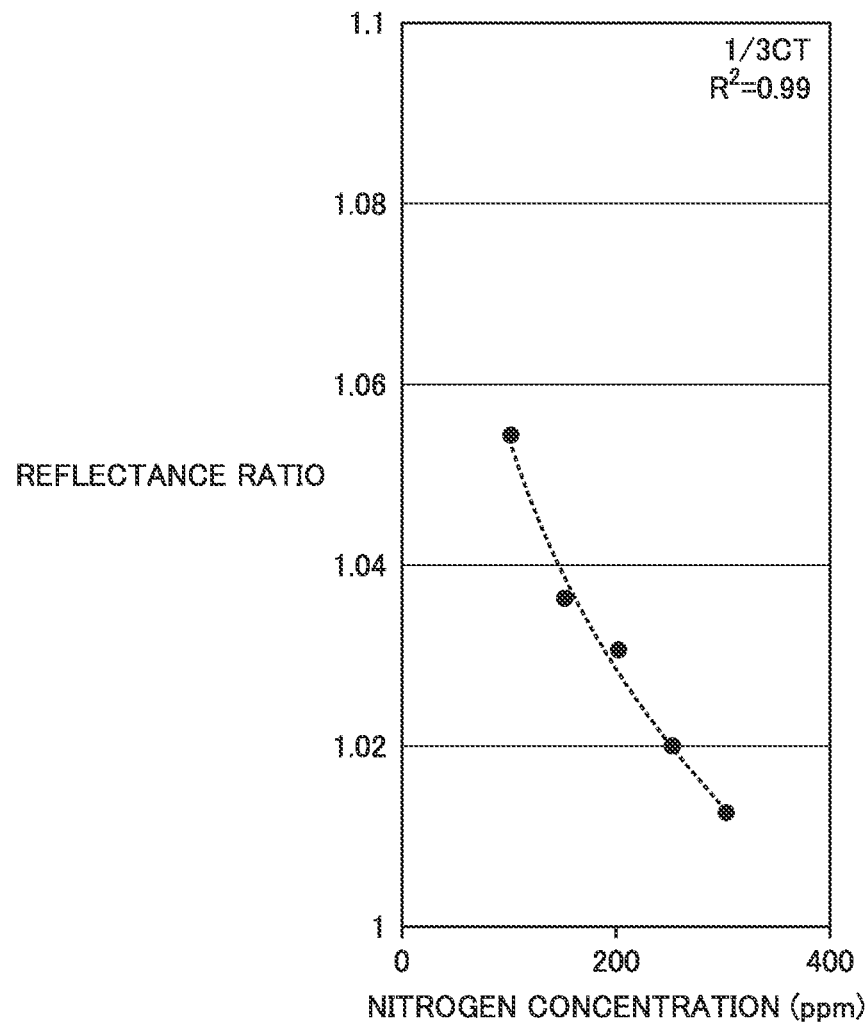
FIG. 7 is a diagram showing relation between a reflectance ratio of diamond and a concentration of nitrogen in diamond in an example in which diamond has a mass of ⅓ carat.
Figure 8:
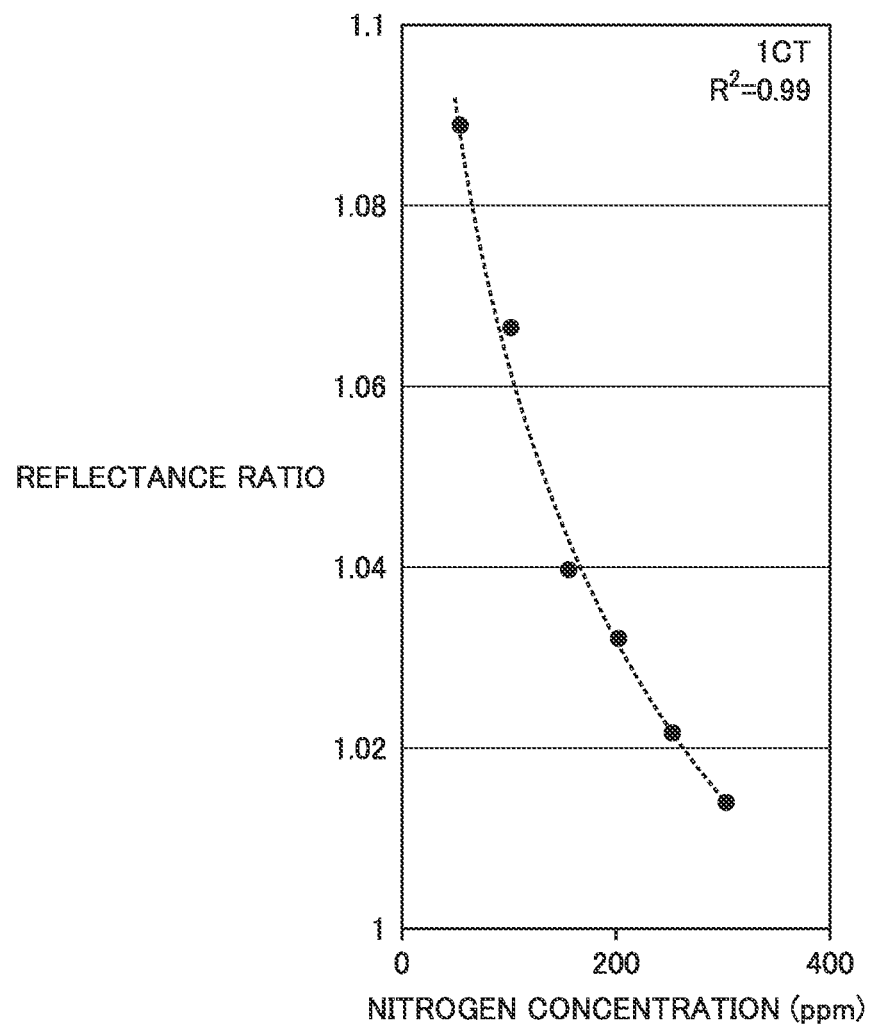
FIG. 8 is a diagram showing relation between a reflectance ratio of diamond and a concentration of nitrogen in diamond in an example in which diamond has a mass of 1 carat.

FIG. 5 is a diagram showing relation between a reflectance ratio of diamond 10 and a concentration of nitrogen in diamond 10 in an example in which diamond 10 has a mass of ¾ carat. FIG. 6 is a diagram showing relation between a reflectance ratio of diamond 10 and a concentration of nitrogen in diamond 10 in an example in which diamond 10 has a mass of ½ carat. FIG. 7 is a diagram showing relation between a reflectance ratio of diamond 10 and a concentration of nitrogen in diamond 10 in an example in which diamond 10 has a mass of ⅓ carat. FIG. 8 is a diagram showing relation between a reflectance ratio of diamond 10 and a concentration of nitrogen in diamond 10 in an example in which diamond 10 has a mass of 1 carat.

In FIGS. 5 to 8, the nitrogen concentration was measured with FT-IR. As shown in FIGS. 5 to 8, the reflectance ratio of diamond 10 strongly correlates with the concentration of nitrogen in diamond 10. It was found that a high coefficient of determination ($R^2$) in relation between the reflectance ratio of diamond 10 and the concentration of nitrogen in diamond 10 was obtained by fitting using exponential approximation or logarithmic approximation. R represents a correlation coefficient.

As shown in FIG. 5, when diamond 10 has a mass of ¾ carat, the coefficient of determination ($R^2$) is 0.98. As shown in FIG. 6, when diamond 10 has a mass of ½ carat, the coefficient of determination ($R^2$) is 0.91. As shown in FIG. 7, when diamond 10 has a mass of ⅓ carat, the coefficient of determination ($R^2$) is 0.99. As shown in FIG. 8, when diamond 10 has a mass of 1 carat, the coefficient of determination ($R^2$) is 0.99.

The expression 1 represents a nitrogen concentration based on a reflectance ratio. As shown in the expression 1, by substituting the reflectance ratio of diamond 10 which is a measurement target into the expression 1, the concentration of nitrogen in diamond 10 which is a measurement target is calculated. In the expression 1, e represents a Napier logarithm.

As shown in FIGS. 5 to 8, it has been confirmed that, when the mass of diamond 10 is substantially equal, the reflectance ratio of diamond 10 strongly correlates with the concentration of nitrogen in diamond 10. Therefore, initially, samples of diamond 10 which is a measurement target are categorized based on a mass. For example, diamond 10 which is a measurement target is categorized into a first group not more than 0.35 carat, a second group more than 0.35 carat and not more than 0.5 carat, a third group more than 0.5 carat and not more than 0.75 carat, a fourth group more than 0.75 carat and less than 1.0 carat, and a fifth group not less than 1.0 carat. In measurement of diamond 10 belonging to the first group, a coefficient A1 is set to $7.0 \times 10^{26}$ and a coefficient A2 is set to −55.9. In measurement of diamond 10 belonging to the second group, coefficient A1 is set to $5.0 \times 10^{20}$ and coefficient A2 is set to −41.8. In measurement of diamond 10 belonging to the third group, coefficient A1 is set to $8.0 \times 10^{17}$ and coefficient A2 is set to −35.43. In measurement of diamond 10 belonging to the fourth group, coefficient A1 is set to $3.0 \times 10^{17}$ and coefficient A2 is set to −34.37. In measurement of diamond 10 belonging to the fifth group, coefficient A1 is set to $2.0 \times 10^{23}$ and coefficient A2 is set to −47.28.

As set forth above, the concentration of nitrogen in diamond 10 is calculated based on data on received visible light and the mass of diamond 10. The data on received visible light includes the reflectance ratio of diamond 10. Specifically, a weight of diamond 10 which is a measurement target is measured in advance. By entering the weight of diamond 10 into the measurement apparatus, the measurement apparatus calculates by conversion, the weight of diamond into carat and selects coefficient A1 and coefficient A2 to be applied in the expression 1. By introducing the result of measurement of the reflectance ratio of diamond 10 into the expression 1, the concentration of nitrogen in diamond 10 is calculated.

The mass of diamond 10 is measured, for example, with a microelectronic balance. The mass of diamond 10 is normally expressed with carat. One carat corresponds to 0.2 gram. The mass of diamond 10 may be calculated, for example, based on a volume of diamond 10 found with an X-ray computed tomography (CT) apparatus. The mass of diamond 10 is calculated as a product of a volume of diamond 10 and a density of diamond 10. In calculating the mass of diamond 10, the density may be assumed as being constant.

The expression 1 may be stored in advance in storage 12 of analysis PC 8. Data on the mass of diamond 10 which is a measurement target may automatically be transferred from a mass measurement apparatus to analysis PC8 or an operator may enter the data into analysis PC 8 through input unit 13. Calculator 11 calculates the concentration of nitrogen in diamond 10 which is a measurement target based on the expression stored in storage 12 and the mass of diamond 10 which is a measurement target.

Functions and effects of the method of measuring a concentration of nitrogen in diamond 10 and the apparatus that measures a concentration of nitrogen in diamond 10 according to the present embodiment will now be described.

According to the method of measuring a concentration of nitrogen in diamond 10 according to the present embodiment, diamond 10 is arranged in inside 31 of integrating sphere 1. Light emitter 2 emits visible light to inside 31. Visible light emitted to inside 31 is reflected by inner surface 9 of integrating sphere 1 with which diamond 10 is irradiated from various directions, passes through or is reflected by diamond 10, and is finally received by light receiver 3. Calculator 11 calculates the concentration of nitrogen in diamond 10 based on data on visible light received by light receiver 3 and a mass of diamond 10. By using integrating sphere 1, diamond 10 is irradiated with visible light from substantially all directions. Therefore, visible light averaged over whole diamond 10 (visible light that is incident on diamond from every direction owing to the integrating sphere and passes through or is reflected by diamond) is received. Therefore, the concentration of nitrogen in diamond 10 can be measured more accurately than in measurement of the concentration of nitrogen in diamond 10 with the visual comparison method.

According to the method of measuring a concentration of nitrogen in diamond 10 according to the present embodiment, diamond 10 which is a measurement target does not have to be machined into a shape like a flat plate as in measurement of the concentration of nitrogen in diamond 10 with the FT-IR method. Therefore, the concentration of nitrogen in diamond 10 can be measured without changing the shape of diamond 10.

According to the method of measuring a concentration of nitrogen in diamond 10 according to the present embodiment, by taking into account the mass of diamond 10, the concentration of nitrogen in diamond 10 can be measured regardless of the shape and the size of diamond 10.

According to the method of measuring a concentration of nitrogen in diamond 10 according to the present embodiment, the concentration of nitrogen in diamond is calculated by comparing the reflectance in the first wavelength range with the reflectance in the second wavelength range, the first wavelength range having the lower limit value smaller than 540 nm which is the lower limit value of the wavelength range (third wavelength range) in which transition from increase in reflectance with increase in concentration of nitrogen in diamond to lowering in reflectance with increase in concentration of nitrogen in diamond is made, the second wavelength range having the upper limit value larger than 580 nm which is the upper limit value of the third wavelength range. Therefore, the concentration of nitrogen in diamond can be measured more accurately than in calculation of the concentration of nitrogen in diamond simply based on the reflectance in the first wavelength range alone, the reflectance in the second wavelength range alone, or the reflectance in the third wavelength range alone.

According to the method of measuring a concentration of nitrogen in diamond 10 according to the present embodiment, the first wavelength range does not have to overlap with the second wavelength range. The concentration of nitrogen in diamond can thus further accurately be measured.

According to the method of measuring a concentration of nitrogen in diamond 10 according to the present embodiment, the first wavelength range may have the upper limit value smaller than 540 nm. The second wavelength range may have the lower limit value larger than 580 nm. The concentration of nitrogen in diamond can thus further accurately be measured.

According to the method of measuring a concentration of nitrogen in diamond 10 according to the present embodiment, in the second step, the visible light emitted to the inside of the integrating sphere may be reflected by the inner surface of the integrating sphere at least once and thereafter may pass through or may be reflected by the diamond arranged in the inside of the integrating sphere.

The apparatus that measures a concentration of nitrogen in diamond 10 according to the present embodiment includes integrating sphere 1, light emitter 2, light receiver 3, and calculator 11. Calculator 11 calculates the concentration of nitrogen in diamond 10 based on data on "averaged visible light (visible light that is incident on diamond 10 from every direction owing to integrating sphere 1 and passes through or is reflected by diamond 10)" received by light receiver 3 and a mass of diamond 10. Therefore, the concentration of nitrogen in diamond 10 can be measured more accurately than in measurement of the concentration of nitrogen in diamond 10 with the visual comparison method.

For the apparatus that measures a concentration of nitrogen in diamond 10 according to the present embodiment, diamond 10 which is a measurement target does not have to be machined into a shape like a flat plate as in measurement of the concentration of nitrogen in diamond 10 with the FT-IR method. Therefore, the concentration of nitrogen in diamond 10 can be measured without changing the shape of diamond 10.

According to the method of measuring a concentration of nitrogen in diamond 10 according to the present embodiment, by taking into account the mass of diamond 10, the concentration of nitrogen in diamond 10 can be measured regardless of the shape and the size of diamond 10.

According to the apparatus that measures a concentration of nitrogen in diamond according to the present embodiment, sample insertion hole 4 may be provided in integrating sphere 1. Light emitter 2 may be arranged such that a straight line along direction of incidence A of the visible light does not pass through sample insertion hole 4 but intersects with inner surface 9. Thus, direct incidence on diamond, of visible light emitted to the inside of the integrating sphere before scattering at the inner surface of the integrating sphere (incidence of most of incident light on diamond from a specific direction) can be avoided, and it can reliably be ensured that visible light received by the light receiver is "averaged visible light (visible light that is incident on diamond 10 from every direction owing to integrating sphere 1 and passes through or is reflected by diamond 10)". Therefore, regardless of arrangement of diamond 10, the concentration of nitrogen in diamond 10 can more accurately be measured.

Example 1

(Sample Preparation)

Figure 9:
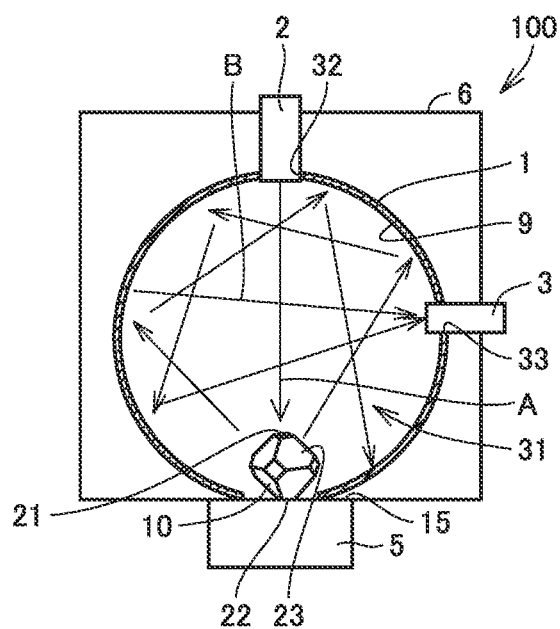
FIG. 9 is a partial schematic cross-sectional view showing a construction in direct irradiation of diamond which is a measurement target with visible light.
Figure 10:
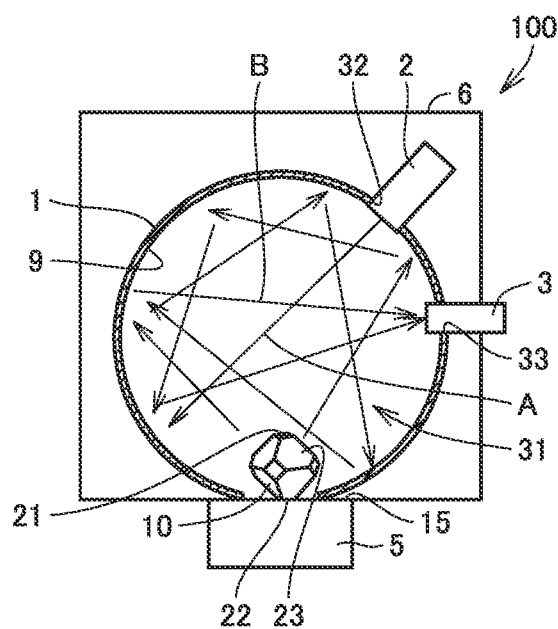
FIG. 10 is a partial schematic cross-sectional view showing a construction in indirect irradiation of diamond which is a measurement target with visible light.

In Example 1, relation between direction of incidence A of incident light and the reflectance ratio was examined. FIG. 9 is a partial schematic cross-sectional view showing a construction in direct irradiation of diamond 10 which is a measurement target with visible light. As shown in FIG. 9, light emitter 2 was arranged directly above diamond 10. Diamond 10 was directly irradiated with visible light emitted from light emitter 2. FIG. 10 is a partial schematic cross-sectional view showing a construction in indirect irradiation of diamond 10 which is a measurement target with visible light. As shown in FIG. 10, light emitter 2 was arranged at a position distant from a position directly above diamond 10 by approximately 30° in a circumferential direction. Diamond 10 was not directly irradiated with visible light emitted from light emitter 2. The concentration of nitrogen in diamond 10 was measured and calculated with the known FT-IR method by machining diamond into a shape like a flat plate for standardization after measurement of the reflectance ratio with the method in Example. A method described in G. S. Woods et al., "The nitrogen content of type Ib synthetic diamond," Philosophical Magazine B, 1990, Vol. 62, No. 6, 589-595 was employed as the known FT-IR method. The concentration of nitrogen in diamond 10 of a Sample 1 calculated with the FT-IR method was 107 ppm. The concentration of nitrogen in diamond 10 of a Sample 2 was 232 ppm. The concentration of nitrogen in diamond 10 in a Sample 3 was 303 ppm.

(Measurement Method)

Figure 11:
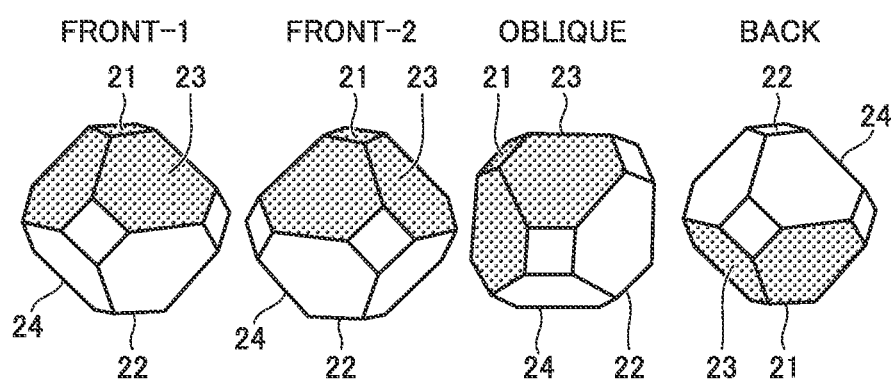
FIG. 11 is a schematic diagram showing a method of arranging diamond which is a measurement target.

FIG. 11 is a schematic diagram showing a method of arranging diamond 10 which is a measurement target. In placing diamond 10 on carrying surface 15 of sample carrier 5, a method of arranging diamond 10 was varied. As shown in FIG. 11, in the method of arrangement in each of front-1 and front-2, diamond 10 was arranged on carrying surface 15 such that second facet 22 was in contact with carrying surface 15. Second facet 22 was a quadrangular face. Diamond 10 in front-2 was arranged by turning diamond 10 in the method of arrangement of front-1 by approximately 90° around a straight line perpendicular to carrying surface 15.

In an oblique arrangement method, diamond 10 was arranged on carrying surface 15 such that fourth facet 24 adjacent to second facet 22 was in contact with carrying surface 15. Fourth facet 24 was a hexagonal face. In a back arrangement method, diamond 10 was arranged on carrying surface 15 such that first facet 21 was in contact with carrying surface 15. First facet 21 is located opposite to second facet 22. First facet 21 was a quadrangular face.

As shown in FIGS. 9 and 10, light emitter 2 emitted visible light to inside 31 of integrating sphere 1. Visible light emitted to inside 31 of integrating sphere 1 was reflected by inner surface 9 of integrating sphere 1 and diffused. ISP-REF manufactured by Ocean Photonics was employed as integrating sphere 1. Flame-S manufactured by Ocean Photonics was employed as spectrometer 7. An integration time was set to 11000 microseconds. The number of times of averaging was set to thirty. The number of pixels was set to 2048. A measurement mode was set to the reflectance. A storage starting wavelength was set to 380 nm. A storage end wavelength was set to 780 nm. A storage pitch wavelength was set to 1 nm. A viewing angle was set to 2°. A halogen lamp (D65) was employed as light emitter 2. A mode was set to an object color mode.

(Measurement Result)

TABLE 1

| Sample No. | Arrangement of Diamond | Nitrogen Concentration (ppm) | Reflectance Ratio (R2/R1) | First Reflectance (R1) | Second Reflectance (R2) |
|---|---|---|---|---|---|
| Sample 1 | Front-1 | 107 | 1.715 | 38.89 | 66.71 |
|  | Front-2 |  | 3.286 | 16.48 | 54.13 |
|  | Oblique |  | 2.131 | 29.96 | 63.83 |
| Sample 2 | Front-1 | 232 | 1.763 | 25.91 | 45.70 |
|  | Front-2 |  | 1.318 | 43.13 | 56.87 |
|  | Oblique |  | 2.477 | 16.01 | 39.66 |
| Sample 3 | Front-1 | 303 | 1.527 | 14.97 | 22.85 |
|  | Front-2 |  | 1.084 | 45.57 | 49.39 |
|  | Back |  | 1.008 | 74.51 | 75.14 |

Figure 12:
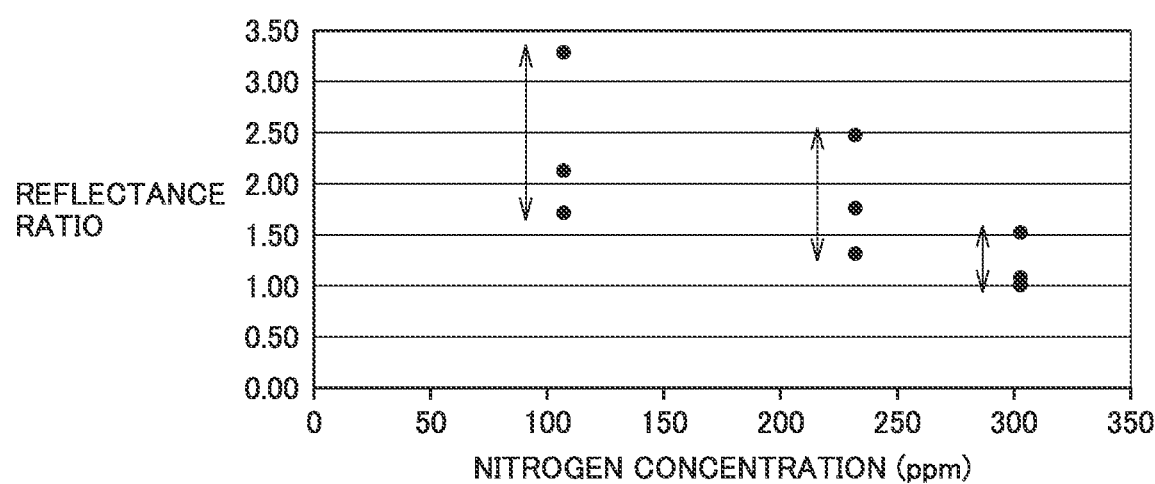
FIG. 12 is a diagram showing relation between a reflectance ratio and a concentration of nitrogen in diamond in Table 1.

Table 1 shows an average value (first reflectance R1) of reflectances in first wavelength range S1 when diamond 10 which was a measurement target was directly irradiated with visible light, an average value (second reflectance R2) of reflectances in second wavelength range S2, and a reflectance ratio (a value calculated by dividing second reflectance R2 by first reflectance R1). First wavelength range S1 was not shorter than 461 nm and 530 nm. Second wavelength range S2 was not shorter than 580 nm and 630 nm. FIG. 12 is a diagram showing relation between a reflectance ratio and a concentration of nitrogen in diamond 10 in Table 1. As shown in Table 1, diamond 10 of Sample 1 and Sample 2 was arranged in front-1 arrangement, front-2 arrangement, and oblique arrangement. Diamond 10 of Sample 3 was arranged in front-1 arrangement, front-2 arrangement, and back arrangement.

As shown in FIG. 12, in direct irradiation of diamond 10 which was a measurement target with visible light, the reflectance ratio significantly varied by varying the method of arrangement of diamond 10. In particular, as the concentration of nitrogen in diamond 10 was lower, a tendency of large variation in reflectance ratio was observed.

TABLE 2

| Sample No. | Arrangement of Diamond | Nitrogen Concentration (ppm) | Reflectance Ratio (R2/R1) | First Reflectance (R1) | Second Reflectance (R2) |
|---|---|---|---|---|---|
| Sample 1 | Front-1 | 107 | 1.042 | 90.40 | 94.16 |
|  | Front-2 |  | 1.041 | 90.39 | 94.14 |
|  | Oblique |  | 1.043 | 90.29 | 94.17 |
| Sample 2 | Front-1 | 232 | 1.021 | 90.32 | 92.22 |
|  | Front-2 |  | 1.022 | 90.09 | 92.07 |
|  | Oblique |  | 1.023 | 89.74 | 91.79 |
| Sample 3 | Front-1 | 303 | 0.999 | 93.39 | 93.34 |
|  | Front-2 |  | 0.999 | 93.59 | 93.54 |
|  | Back |  | 1.000 | 93.12 | 93.08 |

Figure 13:
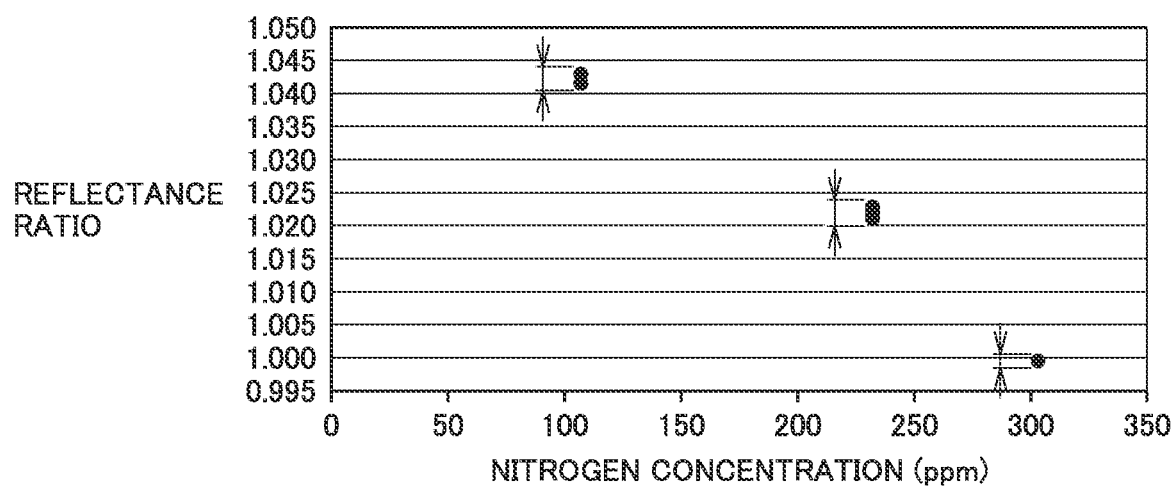
FIG. 13 is a diagram showing relation between a reflectance ratio and a concentration of nitrogen in diamond in Table 2.

Table 2 shows an average value (first reflectance R1) of reflectances in first wavelength range S1 when diamond 10 which was a measurement target was indirectly irradiated with visible light, an average value (second reflectance R2) of reflectances in second wavelength range S2, and a reflectance ratio (a value calculated by dividing second reflectance R2 by first reflectance R1). First wavelength range S1 was not shorter than 461 nm and 530 nm. Second wavelength range S2 was not shorter than 580 nm and 630 nm. FIG. 13 is a diagram showing relation between a reflectance ratio and a concentration of nitrogen in diamond in Table 2. As shown in Table 2, diamond 10 of Sample 1 and Sample 2 was arranged in front-1 arrangement, front-2 arrangement, and oblique arrangement. Diamond 10 of Sample 3 was arranged in front-1 arrangement, front-2 arrangement, and back arrangement.

As shown in FIG. 13, in indirect irradiation of diamond 10 which was a measurement target with visible light, the reflectance ratio hardly varied even when the method of arranging diamond 10 was varied. In other words, it was confirmed that variation in reflectance ratio could be lessened in indirect irradiation of diamond 10 which was a measurement target with visible light even when the method of arranging diamond 10 was varied.

TABLE 3

| Sample No. | Arrangement of Diamond | Nitrogen Concentration (ppm) | Reflectance Ratio over Wide Range (R2/R1) | Reflectance Ratio over Intermediate Range (R2/R1) | Reflectance Ratio over Narrow Range (R2/R1) |
|---|---|---|---|---|---|
| Sample 1 | Front-1 | 107 | 1.012 | 1.023 | 1.042 |
|  | Front-2 |  | 1.012 | 1.023 | 1.041 |
|  | Oblique |  | 1.013 | 1.023 | 1.043 |
| Sample 2 | Front-1 | 232 | 0.997 | 1.012 | 1.021 |
|  | Front-2 |  | 0.998 | 1.012 | 1.022 |
|  | Oblique |  | 0.998 | 1.013 | 1.023 |
| Sample 3 | Front-1 | 303 | 0.990 | 1.000 | 0.999 |
|  | Front-2 |  | 0.990 | 1.000 | 0.999 |
|  | Back |  | 0.991 | 1.000 | 1.000 |

Table 3 shows a reflectance ratio (a value calculated by dividing second reflectance R2 by first reflectance R1) when each of first wavelength range S1 and second wavelength range S2 was varied. For the reflectance ratio over a wide range, first wavelength range S1 was not shorter than 380 nm and not longer than 580 nm and second wavelength range S2 was not shorter than 480 nm and not longer than 730 nm. For the reflectance ratio over an intermediate range, first wavelength range S1 was not shorter than 461 nm and not longer than 580 nm and second wavelength range S2 was not shorter than 530 nm and not longer than 630 nm. For the reflectance ratio over a narrow range, first wavelength range S1 was not shorter than 461 nm and not longer than 530 nm and second wavelength range S2 was not shorter than 580 nm and not longer than 630 nm.

Figure 14:
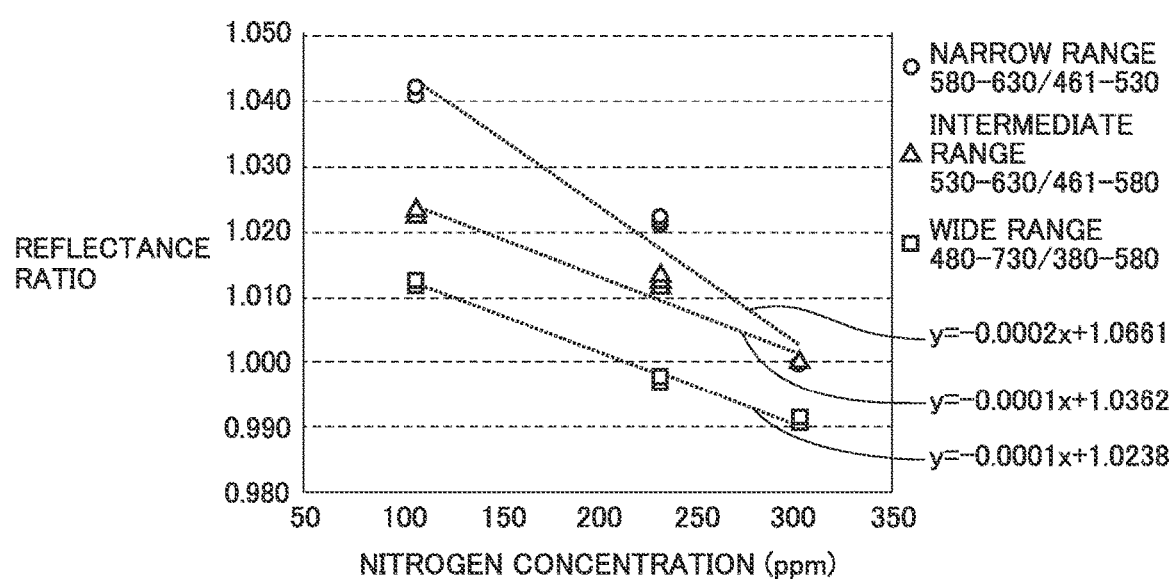
FIG. 14 is a diagram showing relation between a reflectance ratio and a concentration of nitrogen in diamond in Table 3.

FIG. 14 is a diagram showing relation between a reflectance ratio and a concentration of nitrogen in diamond 10 in Table 3. As shown in Table 3, diamond 10 of Sample 1 and Sample 2 was arranged in front-1 arrangement, front-2 arrangement, and oblique arrangement. Diamond 10 of Sample 3 was arranged in front-1 arrangement, front-2 arrangement, and back arrangement. Diamond 10 which was a measurement target was indirectly irradiated with visible light.

As shown in FIG. 14, an absolute value of an inclination of the reflectance ratio over the narrow range was 0.0002. An absolute value of an inclination of each of the reflectance ratio over the intermediate range and the reflectance ratio over the wide range was 0.0001. In other words, when the abscissa represents the nitrogen concentration and the ordinate represents the reflectance ratio, the absolute value of the inclination of the reflectance ratio over the narrow range was larger than the absolute value of the inclination of each of the reflectance ratio over the intermediate range and the reflectance ratio over the wide range. It was confirmed from results above that sensitivity of the reflectance ratio to the nitrogen concentration could be improved by narrowing each of first wavelength range S1 and second wavelength range S2.

Example 2

(Sample Preparation)
In Example 2, diamond 10 according to a Sample 4, a Sample 5, and a Sample 6 was prepared. Diamond 10 according to Sample 4, Sample 5, and Sample 6 is different in nitrogen concentration.

(Measurement Method)
The concentration of nitrogen in diamond 10 according to Sample 4, Sample 5, and Sample 6 was measured with a first method, a second method, and a third method below. The visual inspection method using a color chart was adopted as the first method. An average value of nitrogen concentrations determined by a plurality of inspectors was adopted as the concentration of nitrogen in diamond 10 estimated with the visual inspection method. The integrating sphere method according to the present disclosure was adopted as the second method. In the second method, the nitrogen concentration was measured by using the reflectance ratio over the narrow range described with reference to Table 3. Specifically, first wavelength range S1 was not shorter than 461 nm and not longer than 530 nm and second wavelength range S2 was not shorter than 580 nm and not longer than 630 nm. In the third method, the concentration of nitrogen in diamond 10 was measured with FT-IR. After the concentration of nitrogen in diamond 10 was measured with the second method, diamond 10 was machined into a shape like a flat plate and measurement with FT-IR was conducted.

(Measurement Result)

TABLE 4

| | Nitrogen Concentration (ppm) | | |
|---|---|---|---|
| Sample No. | Visual Inspection Method (Average) | Integrating Sphere Method | FT-IR Method |
| Sample 4 | 75, 81, 84 (80) | 97 | 101 |
| Sample 5 | 158, 165, 175 (166) | 146 | 148 |
| Sample 6 | 268, 280, 283 (277) | 249 | 256 |

Table 4 shows the concentration of nitrogen in diamond 10 found with each of the visual inspection method, the integrating sphere method, and the FT-IR method. As shown in Table 4, in diamond 10 according to each of Sample 4, Sample 5, and Sample 6, a difference between the nitrogen concentration measured with the integrating sphere method and the nitrogen concentration measured with the FT-IR method was smaller than a difference between the nitrogen concentration estimated with the visual inspection method and the nitrogen concentration measured with the FT-IR method. In other words, the nitrogen concentration measured with the integrating sphere method according to the present disclosure was closer to the nitrogen concentration measured with the FT-IR method which was destructive testing than the nitrogen concentration estimated with the visual inspection method. The integrating sphere method according to the present disclosure was shown to accurately calculate the concentration of nitrogen in diamond 10 in a non-destructive manner without conducting destructive testing represented by the FT-IR method.

It should be understood that the embodiment and Examples disclosed herein are illustrative and non-restrictive in every respect. The scope of the present invention is defined by the terms of the claims rather than the embodiment above and is intended to include any modifications within the scope and meaning equivalent to the terms of the claims.

REFERENCE SIGNS LIST 1 integrating sphere; 2 light emitter; 3 light receiver; 4 sample insertion hole; 5 sample carrier; 6 housing; 7 spectrometer; 8 analysis PC; 9 inner surface; 10 diamond; 11 calculator; 12 storage; 13 input unit; 15 surface; 21 first facet; 22 second facet; 23 third facet; 24 fourth facet; 31 inside; 32 light inlet; 33 light outlet; 34 center; 100 measurement apparatus; A direction of incidence; A1, A2, B1, B2, B3, B4, B5, B6, B7, B8, B9 coefficient; B reflected light; C straight line; R variable; R1 first reflectance; R2 second reflectance; S1 first wavelength range; S2 second wavelength range

The invention claimed is:

1. A method of measuring a concentration of nitrogen in diamond, the method comprising:
   a first step of arranging diamond in inside of an integrating sphere;
   a second step of emitting visible light to the inside of the integrating sphere and receiving the visible light that is reflected by an inner surface of the integrating sphere and passes through or is reflected by the diamond arranged in the inside of the integrating sphere; and
   a third step of calculating a concentration of nitrogen in the diamond based on data on the received visible light and a mass of the diamond,
   wherein
   with a reflectance of the visible light in a first wavelength range being defined as a first reflectance, with a reflectance of the visible light in a second wavelength range being defined as a second reflectance, and with a value calculated by dividing the second reflectance by the first reflectance being defined as a reflectance ratio,
   the data on the visible light includes the reflectance ratio,
   the first wavelength range has a lower limit value smaller than 540 nm and smaller than a lower limit value of the second wavelength range,
   the second wavelength range has an upper limit value larger than 580 nm,
   the first wavelength range is smaller in upper limit value than the second wavelength range, and
   in the third step, a carat of the diamond is calculated based on the mass of the diamond, a coefficient A1 and a coefficient A2 in an expression 1 are determined based on the calculated carat of the diamond, and the concentration of nitrogen in the diamond is calculated based on the expression 1:

$$\text{nitrogen concentration}(ppm) = A1 \times e^{(A2 \times \text{reflectance ratio})} \quad \text{(Expression 1)}.$$

2. The method of measuring a concentration of nitrogen in diamond according to claim 1, wherein
   the first wavelength range does not overlap with the second wavelength range.

3. The method of measuring a concentration of nitrogen in diamond according to claim 2, wherein
   the first wavelength range has the upper limit value smaller than 540 nm, and
   the second wavelength range has the lower limit value larger than 580 nm.

4. The method of measuring a concentration of nitrogen in diamond according to claim 1, wherein
   in the second step, the visible light emitted to the inside of the integrating sphere is reflected by the inner surface of the integrating sphere at least once and thereafter passes through or is reflected by the diamond arranged in the inside of the integrating sphere.

5. An apparatus that measures a concentration of nitrogen in diamond, the apparatus comprising:
   an integrating sphere;
   a light emitter that emits visible light to inside of the integrating sphere;
   a light receiver that receives the visible light that is reflected by an inner surface of the integrating sphere and passes through or is reflected by the diamond; and
   a calculator that calculates a concentration of nitrogen in the diamond based on data on the visible light received by the light receiver and a mass of the diamond,
   wherein
   with a reflectance of the visible light in a first wavelength range being defined as a first reflectance, with a reflectance of the visible light in a second wavelength range being defined as a second reflectance, and with a value calculated by dividing the second reflectance by the first reflectance being defined as a reflectance ratio,
   the data on the visible light includes the reflectance ratio,
   the first wavelength range has a lower limit value smaller than 540 nm and smaller than a lower limit value of the second wavelength range,
   the second wavelength range has an upper limit value larger than 580 nm,
   the first wavelength range is smaller in upper limit value than the second wavelength range, and
   a carat of the diamond is calculated based on the mass of the diamond, a coefficient A1 and a coefficient A2 in an expression 1 are determined based on the calculated carat of the diamond, and the concentration of nitrogen in the diamond is calculated based on the expression 1:

$$\text{nitrogen concentration}(ppm) = A1 \times e^{(A2 \times \text{reflectance ratio})} \quad \text{(Expression 1)}.$$

6. The apparatus that measures a concentration of nitrogen in diamond according to claim 5, wherein
   the integrating sphere is provided with a sample insertion hole, and
   the light emitter is arranged such that a straight line along a direction of incidence of the visible light does not pass through the sample insertion hole but intersects with the inner surface.

* * * * *